United States Patent Office 3,393,179
Patented July 16, 1968

3,393,179
PREPARATION OF POLYOXYMETHYLENE ETHERS
Glenn Fredrick Leverett, Vienna, W. Va., assignor to E. I. du Pont de Nemours and Company, Wilmington, Del., a corporation of Delaware
No Drawing. Filed Feb. 17, 1966, Ser. No. 528,079
5 Claims. (Cl. 260—67)

ABSTRACT OF THE DISCLOSURE

A process for the preparation of a high molecular weight polyoxymethylene alkyl ether which consists of contacting the unetherified polymer with a combination of dimethyl or diethyl sulfate and one of the following orthoesters: trimethyl orthoformate, triethyl orthoformate, trimethyl orthoacetate and triethyl orthoacetate in specified amounts and at a temperature in the range 100–180° C. The use of an inert hydrocarbon reaction medium is disclosed.

---

This invention relates to a process for preparing polyoxymethylene ethers, and, more particularly, relates to a process wherein polyoxymethylene having at least one hydroxyl group attached to the polymer chain is contacted with a selected dialkyl sulfate and an orthoester to yield a polyoxymethylene ether which process does not require the addition of an acid or base to catalyze the reaction.

The prior art discloses the use of orthoesters of the type employed in the present process along with acid catalysts to prepare polyoxymethylene ethers, cf. U.S. Patent 3,192,182, issued June 29, 1965, to N. Brown et al. and the use of the dialkyl sulfates along with basic catalysts as alkylating agents.

The prevent invention provides a process which does not require the addition of an acid or base as a catalyst to accomplish the etherification of the polyoxymethylene, but rather the employment of a combination of the aforesaid sulfate and orthoester to accomplish the etherification. Since acids and bases degrade the polymer, their elimination permits the etherification to be conducted at higher temperatures than those previously employed thus providing a more efficient process.

The polyoxymethylene which may be treated according to the process of the present invention are those polymers (including homo- and copolymers) containing a predominance of oxymethylene units ($-CH_2O-$) as a main portion of the polymer chain and which have at least one hydroxyl group as the terminal group on the polymer chain. The orthoesters which are operable in the present invention are trimethyl orthoformate, triethyl orthoformate, trimethyl orthoacetate and triethyl orthoacetate, and the dialkyl sulfates which are operable are dimethyl sulfate and diethyl sulfate.

The reaction conditions are not restricted and a wide variety of conditions may be used in the different embodiments of this process. Etherification may be conducted in any medium which is compatible with the polymer and with the dialkyl sulfate and the orthoester and which permits intimate contact of the reactants. The reaction may be conducted with the polyoxymethylene present as a solid in a slurry with a liquid media, and, depending upon the compound employed as the media and the temperatures at which the etherification is conducted, the reaction may take place with the polymer in solution. The etherification reagents can be in the vapor phase while the polyoxymethylene is present as a solid. Inert gases such as nitrogen and carbon dioxide which are relatively pure can be added as diluents to the vapor in a process where the etherification reagents are in the vapor phase while the polyoxymethylene is present as a solid. Suitable media for conducting a liquid phase reaction are ethers, preferably 1,4-dioxane, aromatic hydrocarbons, preferably toluene, aliphatic hydrocarbons and alkylene and alkyl halides. The dialkyl sulfate and the orthoester can be employed as the medium.

The process is conducted at a temperature in the range 100 to 180° C. with the time of reaction adjusted to the particular temperature employed to obtain a satisfactory reaction rate.

The weight ratio of the dialkyl sulfate to the orthoester is maintained in the range 0.001 to 0.20 and the weight ratio of the orthoester to the polymer is maintained in the range 0.05 to 5.0.

As will be shown in the following examples, the process of the present invention is capable of producing a polyoxymethylene which is substantially 100% stable toward basic materials at elevated temperatures. An increase in base stability of the product as compared to the initial polymer is a satisfactory indication of the reaction, i.e., the degree of etherification, because the starting materials possess substantially no stability toward bases.

Inherent viscosity given in the following examples as a measure of the molecular weight of the polymer was determined according to the technique disclosed in U.S. Patent 3,192,182. Before measuring the inherent viscosity of the starting polymers, the polymer was esterified with propionic anhydride. Parts and percentages are by weight unless otherwise specified.

EXAMPLE 1

Approximately 30 parts of an unstabilized polyoxymethylene prepared in accordance with the general process described in U.S. Patent 3,000,860, issued to N. Brown et al. on Sept. 19, 1961, having an inherent viscosity of 0.71, was charged to an autoclave along with 270 parts of dry 1,4-dioxane, 0.88 part of dimethyl sulfate and 30 parts of trimethyl orthoformate. The autoclave was purged with nitrogen to displace any oxygen, following which the contents were heated to 165° C. at which temperature the polymer was in solution. The solution was then cooled. The polymer precipitated at a temperature of about 120° C. The total time during which the polymer was in solution was approximately 83 minutes. After the contents of the autoclave had cooled to room temperature, the solid polymer was recovered by filtration and washed by reslurrying twice with 160 parts of methanol, once with 200 parts of 1,4-dioxane and twice with 160 parts of acetone. After the acetone wash, the polymer was dried for sixteen hours in a vacuum oven at 70° C. and 29.3 parts of polymer were recovered. This polymer had an inherent viscosity of 0.73.

Two parts of this etherified polyoxymethylene were then added to 50 parts of a solution of benzyl alcohol containing 2 percent tripropyl amine. After purging the system with nitrogen to displace any oxygen, the mixture was heated to 160° C. whereupon the polymer dissolved. This solution was maintained at 160° C. for approximately 30 minutes then cooled to precipitate the polymer. Approximately 1.85 parts of polymer were recovered.

EXAMPLE 2

Approximately 1258 parts of a high molecular weight polyoxymethylene prepared according to the general process disclosed in U.S. Patent 2,994,687, issued to H. H. Goodman et al. on Aug. 1, 1961, having an inherent viscosity of 1.4, was charged to a reactor along with 2200 parts of 1,4-dioxane, 42 parts of dimethyl sulfate and 250 parts of trimethyl orthoformate. The autoclave was then purged with nitrogen to displace oxygen and the contents heated to 130° C. and maintained at that temperature for 90 minutes. After the heating period, the contents were cooled and product removed from the autoclave as a slurry. The polymer was recovered by filtration, rinsed once with 1500 parts of distilled water and then recharged to the autoclave along with 454 parts of sodium hydroxide and 1000 parts of distilled water. The autoclave was purged with nitrogen and heated to 130° C., and maintained at that temperature for 30 minutes, following which the contents of the autoclave were cooled and the product removed. The polymer was washed on a filter with cold distilled water until the electrical conductivity of the filtrate equaled that of the distilled water wash. The polymer was then slurried twice with 1500 parts of acetone for each slurry and placed in a vacuum oven maintained at 70° C. for a period of 16 hours. Approximately 1182 parts of polymer were recovered which exhibited an inherent viscosity of 1.22.

EXAMPLE 3

Approximately 10 parts of the high molecular weight polyoxymethylene prepared according to the general process of U.S. Patent 2,994,687 having an inherent viscosity of 1.08 was charged to an autoclave along with 32 parts of trimethyl orthoformate and 5.3 parts of dimethyl sulfate. This mixture was then heated to a temperature of 130° C. and maintained at that temperature for 30 minutes, following which the mixture was cooled and the polymer separated from the liquid by suction filtration. The polymer was washed, dried and treated with base as set forth in Example 1. It was found to have a base stability of 98.3 percent and an inherent viscosity of 0.87.

EXAMPLE 4

Approximately 600 parts of an unstabilized polyoxymethylene prepared in accordance with the general process described in U.S. Patent 3,000,860 was charged to an autoclave along with 2500 parts of 1,4-dioxane, 200 parts of trimethyl orthoformate and 6.7 parts of dimethyl sulfate. The autoclave was purged with nitrogen to displace any oxygen and the contents were heated to 160° C. during a period of 20 minutes. The contents were maintained at 160° C. for 10 minutes after which the pressure was increased from 60 to 100 p.s.i. by adding gaseous ammonia, simultaneously the temperature was reduced to 150° C. and held at that temperature for one hour, following which the contents of the autoclave were cooled and removed from the autoclave. The polymer was then recovered by filtration and washed on the filtrate with cold, dstilled water until the electrical conductivity of the filtrate equaled that of the distilled waer wash. The polymer was then dried at 70° C. in a vacuum oven for 67 hours. Approximately 567 parts of polymer were recovered having an inherent viscosity of 0.80 and a base stable fraction of 99.5 percent. The dried product was blended with 0.5 percent of a synthetic polyamide and 0.2 percent of an antioxidant and extrusion compounded to a molding powder having excellent thermal stability and color.

EXAMPLE 5

Approximately 400 parts of an unstabilized polyoxymethylene similar to that employed in Example 2 having an inherent viscosity of 1.2 was charged to an autoclave along with 900 parts of toluene, 100 parts of trimethyl orthoformate and 5.6 parts of dimethyl sulfate. The contents of the autoclave were then heated to 145° C. and maintained at that temperature for 30 minutes following which the polymer was recovered by filtration. The polymer was then reslurried twice with 800 portions of acetone and displacement washed with one part of demineralized water per part of polymer per hour for a period of 6 hours then dried in a vacuum oven for 16 hours at 90° C. This product was treated with vapors generated by vaporizing 0.10% solution of guanidine carbonate in water at a temperature of 170° C. for a period of 5 hours. Approximately 96 percent of the polymer originally charged to the reactor was recovered as an etherified polymer having essentially 100 percent stability toward bases.

The foregoing examples illustrate that high molecular weight polyoxymethylene may be converted to a base stable product in high yield employing the process of the present invention in either solution or slurry and with or without a diluent. Results similar to those set forth above are obtained when diethyl sulfate is used in place of dimethyl sulfate and when any of the following orthoesters are used in place of trimethyl orthoformate, triethyl orthoformate, trimethyl orthoacetate and triethyl orthoacetate.

It is desirable, but not absolutely necessary, to contact the etherified polymer produced by the process of the present invention with a base as set forth in the foregoing examples prior to compounding the resin with additives for the production of a commercially desirable material. For example, to the product produced by the process of Example 5 was added 0.5 percent by weight of a synthetic polyamide (terpolymer of approximately 38 percent of polycaprolactam, 35 percent polyhexamethylene adipamide and 27 percent polyhexamethylene sebacamide) 0.2 percent of 2,2'-methylene-bis(4-methyl-6-t-butyl phenol) and 0.1 percent trimetholaminomethane. This composition was then extrusion compounded to yield a product possessing excellent thermal stability and color.

The polymers processed according to this invention find widespread utility in the production of film by pressing or extrusion, spinning of fibers, filaments or bristle material and injection molding of gears and like items. The composition is especially effective in resistance to degradation in basic media as shown in the foregoing examples.

I claim:
1. A process for the preparation of a high molecular weight polyoxymethylene alkyl ether which consists of contacting a high molecular weight polyoxymethylene starting material having at least one of its terminal valences satisfied by a hydroxyl group with the combination of (1) a sulfate selected from the class consisting of dimethyl sulfate and diethyl sulfate and (2) an orthoester selected from the class consisting of trimethyl orthoformate, triethyl orthoformate, trimethyl orthoacetate and triethyl orthoacetate at a temperature in the range 100 to 180° C., and thereafter recovering said alkyl ether having an ether group for at least one of the terminal portions of the polymer chain.

2. The process of claim 1 wherein the weight ratio of the said sulfate to the said orthoester is 0.001 to 0.20 and the weight ratio of the said orthoester to the said starting material is 0.05 to 5.0.

3. The process of claim 2 wherein said sulfate is dimethyl sulfate and said orthoester is trimethyl orthoformate.

4. The process of claim 3 conducted in the presence of a normally liquid, inert hydrocarbon medium.

5. The process of claim 3 conducted in a medium of 1,4-dioxane.

References Cited

UNITED STATES PATENTS 3,193,531   7/1965   Heller _____ 260—67

WILLIAM H. SHORT, *Primary Examiner.*

L. M. PHYNES, *Assistant Examiner.*